US012810161B2

(12) United States Patent
Rajapakse et al.

(10) Patent No.: US 12,810,161 B2
(45) Date of Patent: Nov. 24, 2026

(54) ROBUST ADVERSARIAL IMMUNE-INSPIRED LEARNING SYSTEM

(71) Applicant: THE REGENTS OF THE UNIVERSITY OF MICHIGAN, Ann Arbor, MI (US)

(72) Inventors: Indika Rajapakse, Ann Arbor, MI (US); Alfred Hero, Ann Arbor, MI (US); Alnawaz Rehemtulla, Ann Arbor, MI (US); Ren Wang, Ann Arbor, MI (US); Stephen Lindsly, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1379 days.

(21) Appl. No.: 17/643,290

(22) Filed: Dec. 8, 2021

(65) Prior Publication Data

US 2022/0188642 A1 Jun. 16, 2022

Related U.S. Application Data

(60) Provisional application No. 63/123,684, filed on Dec. 10, 2020.

(51) Int. Cl.
*G06N 3/086* (2023.01)

(52) U.S. Cl.
CPC .................................... *G06N 3/086* (2013.01)

(58) Field of Classification Search
CPC ...... G06N 3/086; G06N 3/045; G06N 3/0464; G06N 3/09; G06N 3/094
See application file for complete search history.

(56) References Cited

U.S. PATENT DOCUMENTS 10,867,246 B1 * 12/2020 Nguyen ................. G06N 20/00
11,005,661 B1 * 5/2021 Neumann ................ G06N 7/01
(Continued)

OTHER PUBLICATIONS

Wang, Ren et al. "Immuno-mimetic Deep Neural Networks (Immuno-Net)", ICML 2021 Workshop on Computational Biology, Jul. 24, 2021.

(Continued)

*Primary Examiner* — Hien L Duong
(74) *Attorney, Agent, or Firm* — Harness, Dickey & Pierce, P.L.C.

(57) ABSTRACT

The lack of robustness of Deep Neural Networks (DNNs) against different types of attacks is problematic in adversarial environments. The long-standing and arguably most powerful natural defense system is the mammalian immune system, which has successfully defended the species against attacks by novel pathogens for millions of years. This disclosure proposes a Robust Adversarial Immune-inspired Learning System (RAILS) inspired by the mammalian immune system. The RAILS approach is demonstrated using adaptive immune system emulation to harden Deep k-Nearest Neighbor (DkNN) architectures against evasion attacks. Using evolutionary programming to simulate new B-cell generation that occurs in natural immune systems, e.g., B-cell flocking, clonal expansion, and affinity maturation, it is shown that the RAILS learning curve exhibits similar learning behavior as observed in in-vitro experiments on B-cell affinity maturation. The life-long learning mechanism allows RAILS to evolve and defend against diverse attacks.

12 Claims, 11 Drawing Sheets

(56) References Cited

U.S. PATENT DOCUMENTS

| | | | | |
|---|---|---|---|---|
| 11,836,160 | B1 * | 12/2023 | Xia | G06N 20/00 |
| 12,288,154 | B2 * | 4/2025 | Eykholt | G06F 18/231 |
| 2018/0052961 | A1 * | 2/2018 | Shrivastava | G06F 16/285 |
| 2019/0310650 | A1 * | 10/2019 | Halder | G05D 1/0088 |
| 2020/0074247 | A1 * | 3/2020 | Dubovsky | G06F 18/2413 |
| 2020/0356863 | A1 * | 11/2020 | Saha | G06N 3/047 |
| 2020/0394447 | A1 * | 12/2020 | Chae | G06F 18/22 |
| 2021/0058415 | A1 * | 2/2021 | Sanzgiri | G06N 3/09 |
| 2021/0133604 | A1 * | 5/2021 | Neumann | G06N 5/01 |
| 2021/0287069 | A1 * | 9/2021 | Mumcuyan | G06N 3/048 |
| 2021/0312611 | A1 * | 10/2021 | Neumann | G06T 7/0012 |
| 2021/0327413 | A1 * | 10/2021 | Suwandy | G10L 15/197 |
| 2021/0343392 | A1 * | 11/2021 | Neumann | G06N 20/20 |
| 2021/0364392 | A1 * | 11/2021 | Huang | G06N 20/00 |
| 2021/0366095 | A1 * | 11/2021 | Krishnamoorthy | G06F 17/16 |
| 2021/0390122 | A1 * | 12/2021 | Ghosh | G06F 16/285 |
| 2022/0004174 | A1 * | 1/2022 | Kaira | G06F 18/23 |
| 2022/0027760 | A1 * | 1/2022 | Sakai | G06F 18/217 |
| 2022/0083840 | A1 * | 3/2022 | Luong | G06N 20/00 |
| 2022/0156563 | A1 * | 5/2022 | Zhang | G06F 18/2433 |
| 2022/0254005 | A1 * | 8/2022 | Wilkinson | G06N 3/0475 |
| 2022/0351024 | A1 * | 11/2022 | Khayrallah | G06N 3/08 |

OTHER PUBLICATIONS

Jamali, Shahram et al., "DAWA: Defending against wormhole attack in MANETs by using fuzzy logic and artificial immune system", Journal of Supercomputing 73, No. 12: 5173-5196, May 24, 2017.

Scaranti, Gustavo F. et al., "Artificial immune systems and fuzzy logic to detect flooding attacks in software-defined networks", IEEE Access 8: 100172-100184, May 27, 2020.

Tarao, Mitsunobu et al., "Toward an artificial immune server against cyber attacks: enhancement of protection against DoS attacks." Procedia Computer Science 96: 1137-1146, Sep. 4, 2016.

Gupta, Kishor Datta et al., "Using Negative Detectors for Identifying Adversarial Data Manipulation in Machine Learning", 2021 International Joint Conference on Neural Networks (IJCNN), pp. 1-8, IEEE, Sep. 20, 2021.

Rademaker, Thomas J. et al., "Attack and defense in cellular decision-making: lessons from machine learning", Physical Review X 9, No. 3: 031012, Jul. 26, 2019.

* cited by examiner

ROBUST ADVERSARIAL IMMUNE-INSPIRED LEARNING SYSTEM

CROSS REFERENCE TO RELATED APPLICATION

This application claims the benefit of U.S. Provisional Application No. 63/123,684, filed on Dec. 10, 2020. The entire disclosure of each of the above application is incorporated herein by reference.

GOVERNMENT CLAUSE

This invention was made with government support under HR00112020011 by the U.S. Department of Defense, Defense Advanced Research Projects Agency. The government has certain rights in the invention.

FIELD

The present disclosure relates to techniques for emulating immune system defense mechanisms to thwart adversarial attacks on deep learning systems.

BACKGROUND

State of the art in supervised learning, especially deep learning, has dramatically improved over the past decades. Many techniques are widely used as effective tools aiding human tasks, e.g., face recognition, object detection, natural language processing. Despite effectiveness, deep learning techniques have all been demonstrated vulnerable to imperceptibly examples intentionally designed by evasion attack (aka. adversarial attack). The vulnerability of deep neural networks (DNN) restricts its application scenarios and motivates researchers to develop various defense techniques.

The current defense methods can be broadly divided into three categories: (1) adversarial example detection, (2) robust training, and (3) robust deep architectures. The first category of methods intends to protect the model by distinguishing the adversarial examples. However, it was shown that adversarial detection methods are not perfect and can be easily defeated. Different from detecting the outliers in the first category, robust training aims to harden the model to deactivate the evasion attack. Known robust training methods are tailored to a certain level of attack strength in the context of $l_p$-perturbation. Moreover, the trade-off between accuracy and robustness becomes an obstruction to enhance the robustness. Recent works are also exploring another possibility designing robust deep architectures that are naturally resilient to evasion attacks. Nevertheless, relying on the architecture alone cannot provide enough robustness, either the prediction confidence.

Facing the artificial design system's vulnerability to attacks, a natural question to ask is: can we find a robust biological system for our reference? The immune system may be the answer. Recent studies have shown that the immune system takes advantages of the three categories of defense mechanisms and incorporates life-long learning, permitting continuous hardening of the system. The immune system has the detector to distinguish the non-self contents from the self components, and is embedded with robust natural architecture. Even more surprising, the immune system continuously increases its robustness by adaptively learning from attacks.

Motivated by the immune system's powerful defense ability, this disclosure aims to develop a Robust Adversarial Immune-Inspired Learning System (RAILS) that can effectively defend against evasion attacks on deep learning systems.

This section provides background information related to the present disclosure which is not necessarily prior art.

SUMMARY

This section provides a general summary of the disclosure, and is not a comprehensive disclosure of its full scope or all of its features.

A computer-implemented method is presented for classifying an input using a deep learning system. The method includes: receiving an input for a deep learning system, where the deep learning system was trained with a training dataset and the training dataset includes data for a plurality of classes; for each class in the training dataset, identifying a set of data points in the training dataset, where the data points in the set of data points are similar to the input; for each set of data points, generating additional data points from data points in the set of data points using genetic operators (such as selection, mutation, and crossover); for each of the data points, calculating a similarity score in relation to the input; selecting a subset of data points with the highest similarity scores amongst the data points; and predicting a class label for the input from the plurality of classes, where the prediction of a class label for the input is determined by consensus of the data points in the subset of data points with the highest similarity scores.

In some embodiments, the input is identified as an outlier prior to the step of identifying a set of data points, and remaining steps of the method are performed only when the input is identified as an outlier.

The method may further include: selecting a first subset of data points and selecting a second subset of data points, where the data points in the first subset of data points have an average similarity score higher than the average similarity score of the data points in the second subset of data points, and the data points in the second subset of data points has an average similarity score higher than the average similarity score for all of the data points. Furthermore, the input is classified to a predicted class in the plurality of classes, where the predicted class has the most similar data points to the input in the first subset of data points; and the training dataset is updated by appending the data points in the second subset to the training dataset.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
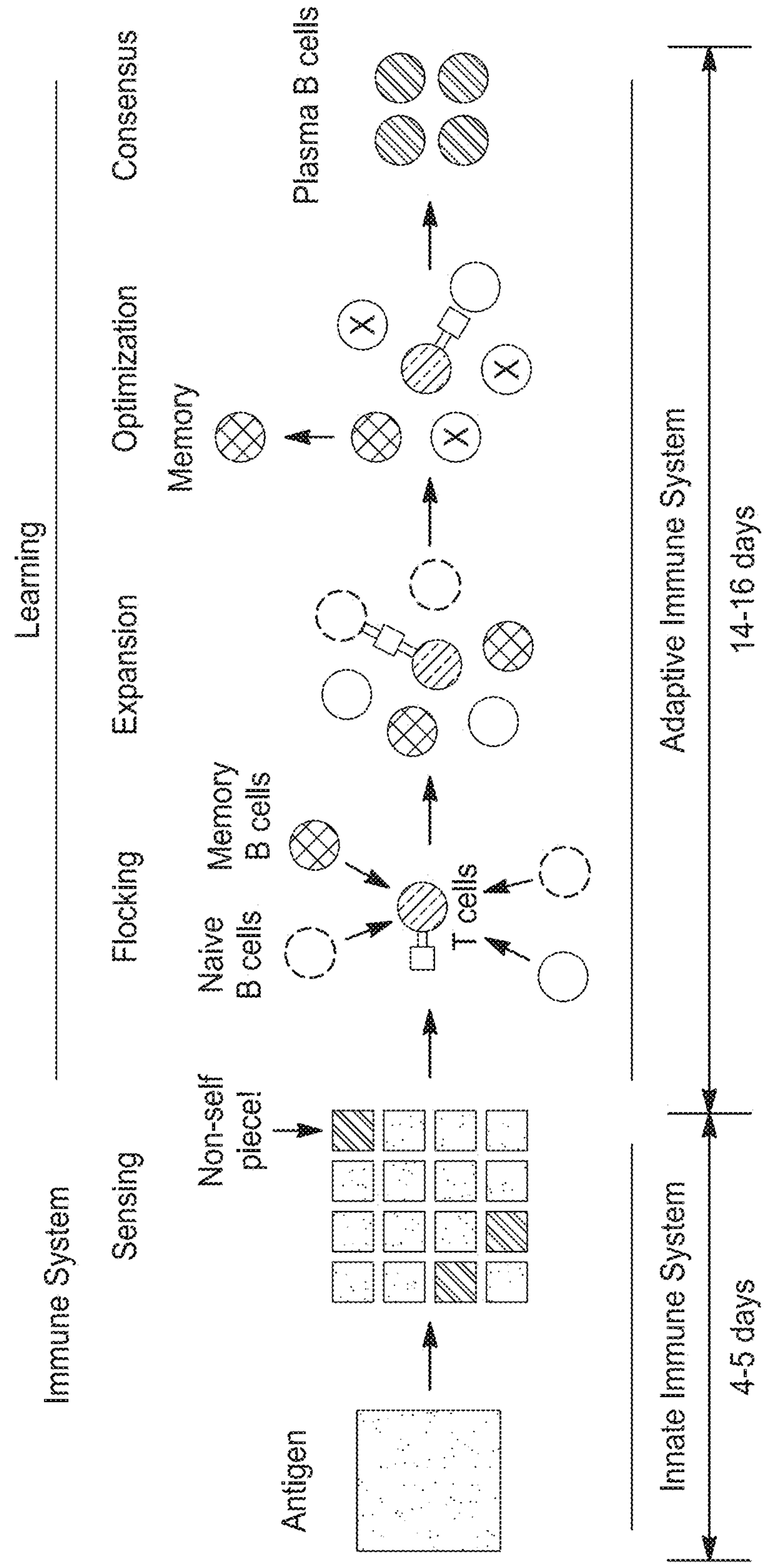
FIG. 1 is a diagram illustrating a simplified immune system.

Robustness in systems comes from architecture, and one of the greatest examples of this is within the mammalian adaptive immune system. With reference to FIG. 1, the architecture of the adaptive immune system ensures a robust response to foreign antigens, splitting the work between active sensing and competitive growth to produce an effective antibody. Sensing of a foreign attack leads to antigen-specific B cells flocking to lymph nodes, and forming temporary structures called germinal centers. Here a diverse initial set of B cells bearing antigen-specific immunoglobulins divide symmetrically in the expansion phase to populate the germinal center in preparation for affinity maturation. During affinity maturation, or the selection phase, B cells with the highest affinity to the antigen are repeatedly selected to asymmetrically divide and mutate for affinity optimization. Within this step, memory B cells are created which can be used to defend against similar attacks in the future. B cells that reach consensus, or achieve a threshold affinity against the foreign antigen, undergo terminal differentiation into plasma B cells, which represent the actuators of the humoral adaptive immune response. The adaptive immune system is incredibly complex, but one can simplify its robust learning process into these five steps: sensing, flocking, expansion, optimization, and consensus.

Figure 2:
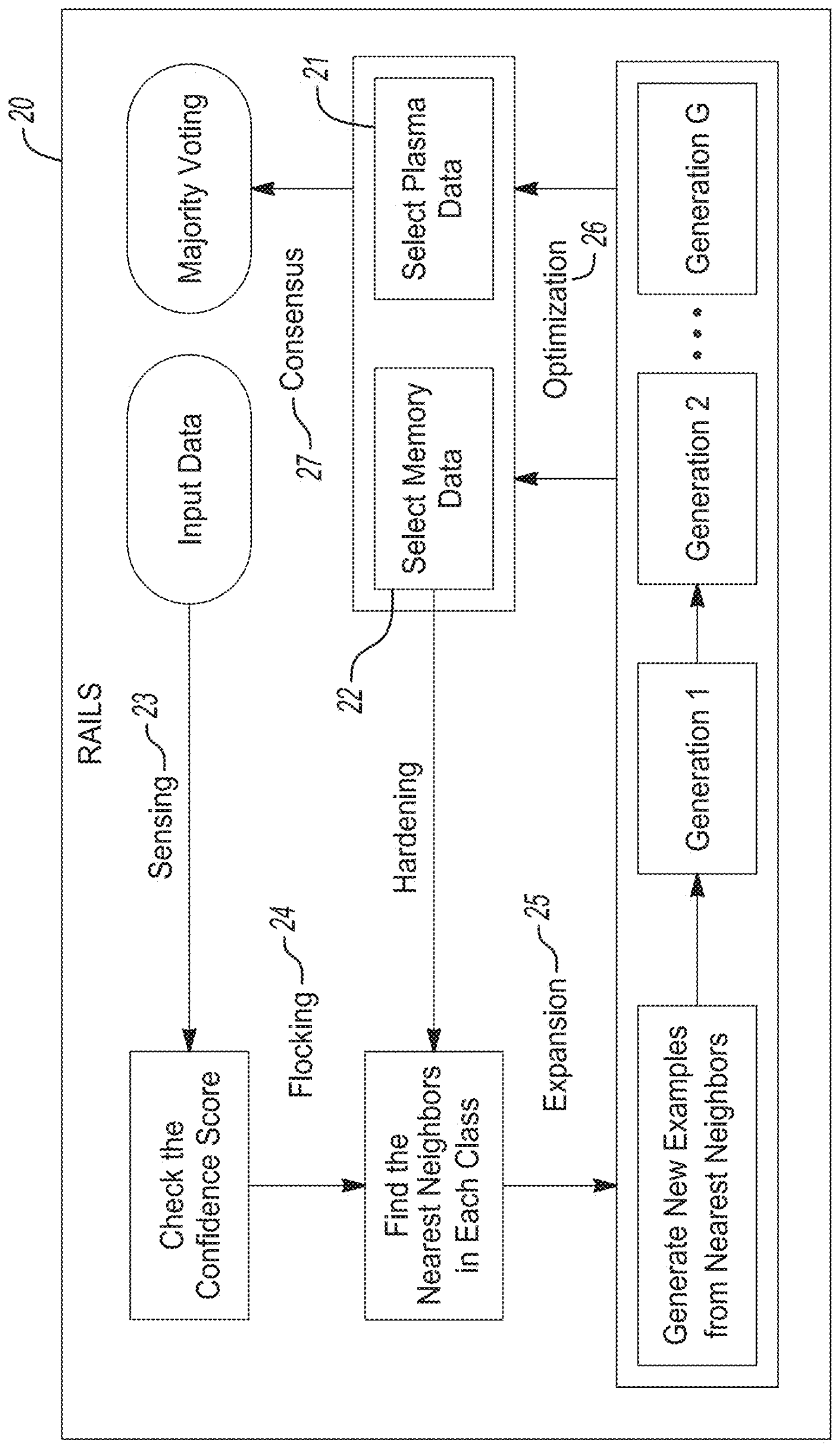
FIG. 2 is a block diagram showing the computational workflow of the proposed RAILS system.

The immune system has formed an effective self renewal defense system through millions of years of evolution. Motivated by the recent understanding of the immune system, this disclosure proposes a new defense system—Robust Adversarial Immune-Inspired Learning System (RAILS). This computational system has a one-to-one mapping to the simplified immune system. FIG. 2 illustrates the computational workflow for the RAILS system 20. For example, the RAILS system 20 emulates the clonal expansion in the immune system, which enlarges the population of the candidates (B-cell). Similar to the plasma B-cell and memory B-cell generated in the immune system, the RAILS system generates plasma data 21 and memory data 22. Plasma B-cell data 21 is used to predict the present inputs, while memory B-cell data 22 is used to generate the antibody of the present antigen. They are all used to defend against the current attacks. Memory data and memory B-cell also have the same function in that they all contribute to the defense of future attacks.

Figure 3A:
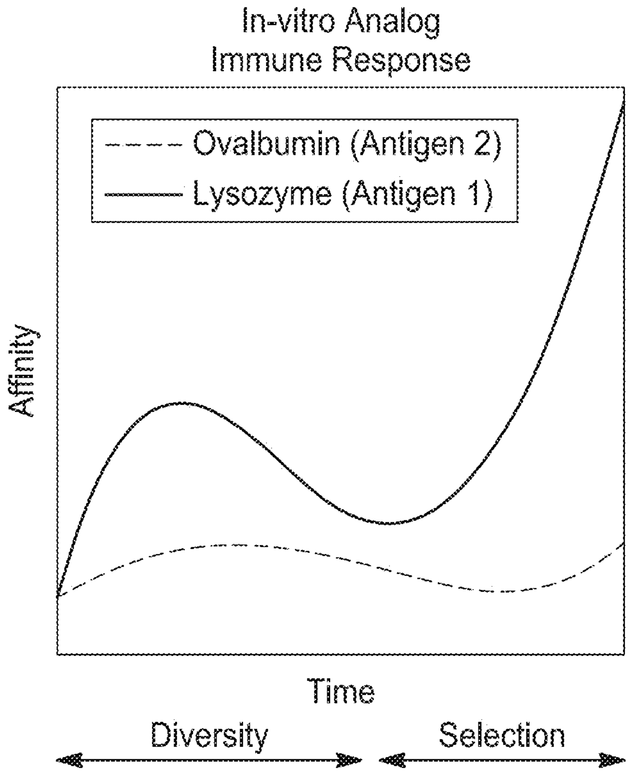
FIGS. 3A and 3B are graphs showing the learning curves for an in-vitro analog immune system and the RAILS system, respectively.
Figure 3B:
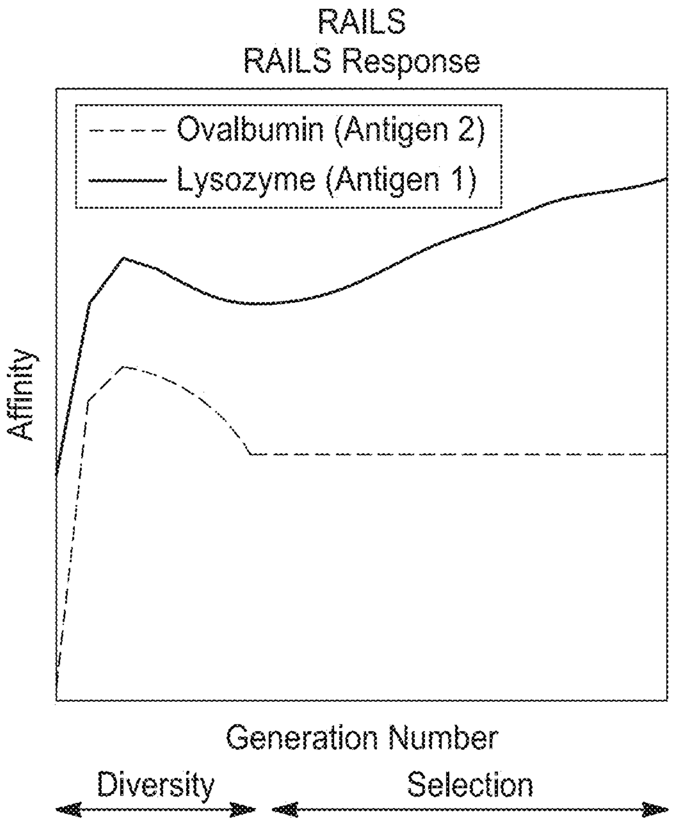

To demonstrate that the computational system indeed captures some exclusive properties of the immune system, the learning curves for an immune system and the RAILS system 20 are shown in FIGS. 3A and 3B, respectively. The green and red lines depict the affinity change between the population and the antigen (test data). The activated naive B-cell (nearest data points) come from antigen 1 (test data 1) in all tests. The immune system's learning curves have a small affinity decrease at the beginning. This phenomenon demonstrates a two-phase learning process—expansion and optimization. Expansion corresponds to B-cell diversity, while optimization corresponds to B-cell selection. Surprisingly, one observes the same phenomenon in the learning curve for the RAILS system 20. This suggests that the computational system is aligned with the immune system.

Adaptive Immune System Emulation (AISE) is designed and implemented with a bionic process inspiring by the mammalian immune system. Concretely, AISE generates plasma data (plasma B-cells) and memory data (memory B-cells) through multiple generations of evolutionary programming that includes three operations, namely, selection, mutation, and cross-over. The plasma data and memory data are selected in different ways, thus contributing to different model robustifying levels. The plasma data contributes to the robust predictions of the present inputs, and the memory data helps to adjust the classifiers to effectively defend future attacks. From the perspective of classifier adjustment, AISE's learning process can be divided into static learning and adaptive learning.

Figure 4:
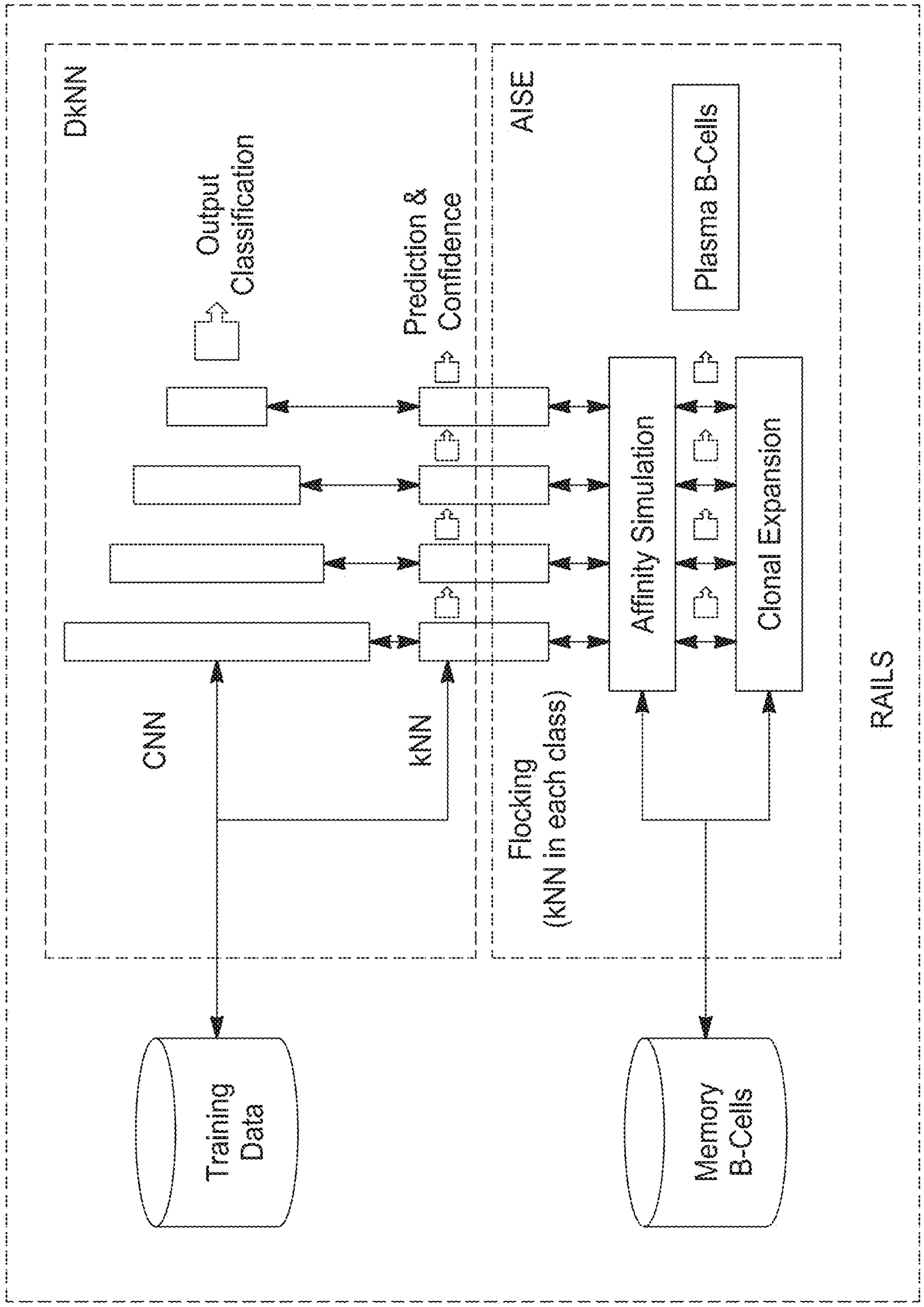
FIG. 4 is a diagram showing adaptive immune system emulation integrated with a deep n-nearest neighbor method.

Static learning helps to correct the predictions of the present inputs. For illustration purposes, adaptive immune system emulation is shown integrated with a deep k-nearest neighbor (DkNN) algorithm as seen in FIG. 4. While reference is made herein to k-nearest neighbor algorithms, it is readily understood that the adaptive immune system emulation techniques can be integrated with other types of classification method, including but not limited to decision trees, neural networks and support vector machines.

Recall that DkNN algorithms integrate predicted k nearest neighbors of layers in the deep neural network, and the final prediction $y_{DkNN}$ can be obtained by the following formula.

$$y_{DkNN} = \operatorname{argmax}_c \sum_{l=1}^{L} p_1^c(x) \quad \text{subject to } c \in [C] \tag{1}$$

where l is the l-th layer of a DNN with L layers in total.

$$p_l^c(x)$$

is the probability predicted by kNN of class c in layer l of input x. There is a finite set of classes and the total number is C. [C] denotes the set [1, 2, . . . , C]. Note that $$p_l^c(x)$$

could be small for poisoned data, e.g., adversarial example, even c is the true class $y_{true}$. The purpose of the static learning is to increase $$p_l^{y_{true}}(x)$$

(even to one) of the present input x. The key idea is to generate new examples via clonal expansion and optimization, and only select the examples with high affinity (plasma data) to the input. The hypothesis is that examples inherited from parents of class $y_{true}$ have higher chance of reaching the high affinity and, therefore, survival. After the process, a majority vote is enough to make the correct prediction.

Different from static learning, adaptive learning tries to harden the classifiers to defend the potential attacks in the future. The hardening is done by leveraging another set of data—memory data generated after clonal expansion. Unlike plasma data, memory data is selected from examples with moderate-affinity to the input, which can rapidly adapt to new variants of the current adversarial examples. This approach permits the continuous hardening of the model during the inference stage, which is life-long learning accompanied by increasing defensive ability. The adaptive learning will provide a naturally high $$p_l^{y_{true}}(x)$$

even if using the DkNN alone. This disclosure will mainly focus on static learning and single-stage adaptive learning that only hardens the classifier once. It is envisioned that the concepts herein can be extended to multi-stage adaptive learning as well.

With continued reference to FIGS. 2 and 4, an example implementation for the proposed RAILS system 20 is described. Given a mapping $\mathbb{R}^d \rightarrow \mathbb{R}^d$ and two vectors $x_1$, $x_2 \in \mathbb{R}^d$, first define the affinity score between $x_1$, $x_2$ as $A(F; x_1, x_2) = -\|F(x_1) - F(x_2)\|2$, where A is the affinity function using a negative Euclidean distance. In the DNN context, F denotes the feature mapping from input to a feature representation, and A measures the similarity between two inputs. In this context, the affinity score is understood to be a distance score or a similarity score, where higher affinity scores indicate higher similarity.

Sensing is the first step of the process as indicated at 23. This step is to conduct the initial identification of the adversarial inputs and the clean inputs. The identification is an outlier detection process and can be done using different methods. In one example, DkNN provides a metric called credibility that can measure the consistency of k-nearest neighbors in each layer. The higher the credibility, the higher the confidence that the input is clean (i.e., not an outlier). Other suitable outlier detection methods include those described by L. Zhou, Y. Wei and A. Hero in "Second-Order Asymptotically Optimal Universal Outlying Sequence Detection with Reject Option," arxiv:2009.03505, September 2019; by E. Hou, K. Sricharan, A. O. Hero in "Latent Laplacian Maximum Entropy Discrimination for Detection of High-Utility Anomalies" IEEE Transactions on Information Forensics and Security, Vol. 13, No. 6, pp. 1446-1459, June 2018; and by K. Sricharan and A O Hero in "Efficient anomaly detection using bipartite k-NN graphs," Proc. of Neural Information Processing Systems (NIPS), Grenada Spain, December 2011 which are incorporated by reference herein. These example are merely illustrative and other outlier detection methods are also contemplated by this disclosure.

The sensing stage provides a confidence score of the DkNN architecture. In some embodiments, the remaining steps of the classification are executed only when the input is identified as an outlier. That is, the confidence score is below a predetermined threshold. In other embodiments, the sensing stage can be skipped or omitted from the classification process implemented by the RAILS system 20.

Flocking 24 is the start point for clonal expansion. For each class and each layer, find the k-nearest neighbors that have the highest initial affinity score to the input data. Mathematically, select $$N_l^c = \{(\hat{x}, y_c | R_c(\hat{x}) \leq k, (\hat{x}, y_c) \in D_c\} \quad (2)$$

Given $$A(f_l; x_i^c, x) \leq A(f_l; x_i^c, x) \Leftarrow R_c(i) > R_c(j)$$

$$\forall\, c \in [C],\ l \in [L],\ \forall\, i, j \in [n_c],$$

where x is the input, Dc is the training dataset from class c and the size $|D_c| = n_c \cdot R_c : [n_c] \rightarrow [n_c]$ is a ranking function that sorts the indices based on the affinity score. If memory data exists, the nearest neighbors method uses both the training data and the existing memory data.

Next, expansion 25 generates new examples (offspring) from the existing examples (parents). The ancestors are nearest neighbors found by the flocking step. The process can be viewed as creating new nodes linked to the existing nodes, and can be characterized by Preferential Attachment as described by Barabasi and Albery in "Emergence of Scaling in Random Networks" Science, 286(5439): 509-512. The probability of a new node linking to node i is $$\Pi(k_i) = \frac{k_i}{\sum_j k_j}, \quad (3)$$

where $k_i$ is the degree of node i. New nodes prefer to attach to existing nodes having a high degree. In the RAILS system 20, the degree is the exponential of affinity measurement, and the offspring is generated by parents having high probability in the network and subnetworks. In the example embodiment, the diversities in expansion are provided by genetic operators of selection, mutation and cross-over. Other types of genetic operators are also contemplated by this disclosure. After new examples are generated, the RAILS system calculates each new example's affinity score to the input. The new examples are associated with labels that are inherited from their parents.

Optimization (affinity maturation) step 26 selects generated examples with high affinity scores to be plasma data 21, and examples with moderate-affinity scores are saved as memory data 22. The selection is based on a ranking function.

$$S_{opt} = \left\{(\tilde{x}, \tilde{y}) \middle| R_g(\tilde{x}) \leq \Upsilon \left|P^{(G)}\right|, (\tilde{x}, \tilde{y}) \in P^{(G)}\right\} \quad (4)$$

where $R_g : [|P^{(G)}|] \rightarrow [|P^{(G)}|]$ is the same ranking function as $R_c$ except that the domain is the set of cardinality of the final population $P^{(G)}$. In one example, Y is a percentage parameter and is selected as 0.05 and 0.25 percent for plasma data and memory data, respectively. Note that the memory data can be selected in each generation and in a nonlinear way. In the example embodiment, memory data is selected only in last generation. Memory data will be saved in a secondary database of the system and used for model hardening.

Consensus 27 is preferably used to predicting a class label for the input. That is, the prediction of the class label for the input is determined by consensus of the data points with the highest similarity scores. In one example embodiment, the prediction for the input is determined by majority vote although other consensus methods also fall within the scope of this disclosure. Note that all the examples are associated with labels.

Algorithm 1 below further describes the five step workflow for the RAILS system 20.

Algorithm 1 Robust Adversarial Immune-inspired Learning System (RAILS)

Require: Test data point x; Training dataset $\mathcal{D}_{tr} = \{\mathcal{D}_1, \mathcal{D}_2, \ldots, \mathcal{D}_C\}$; Number of Classes C; Model M with feature mapping $f_l(\cdot)$, $l \in \mathcal{L}$; Affinity function A.

First Step: Sensing

1: Check the threat score given by an outlier detection strategy to detect the threat of x.

Second Step: Flocking

2: for c = 1, 2, . . . , C do

3: In each layer $l \in \mathcal{L}$, find the k-nearest neighbors $\mathcal{N}_l^c$ of $x$ in $\mathcal{D}_c$ by ranking the affinity score $A(f_l; x_j, x)$, $x_j \in \mathcal{D}_c$ 4: end for Third and Fourth Steps: Expansion and Optimization 5: Return plasma data $S_p$ and memory data $S_m$ by using subroutine: Algorithm 2

Fifth Step: Consensus

6: Obtain the prediction y of x using the majority vote of the plasma data

7: Output: y, the memory data

It is to be understood that only the relevant steps of the algorithm are shown, but that other software-implemented instructions may be needed to control and manage the overall operation of the system.

Clonal expansion and affinity maturation (optimization) are the two main steps after flocking. Algorithm 2 below sets for an example implementation for these two steps.

Algorithm 2 Clonal Expansion & Optimization

Require: $x$; $k$-nearest neighbors in each layer $\mathcal{N}_l^c$, $c \in [C]$, $l \in \mathcal{L}$; Population size T; Maximum generation number G: Mutation probability p; Mutation range parameters $\delta_{min}$, $\delta_{max}$; Sampling temperature $\tau$ 1: For each layer $l \in \mathcal{L}$, do 2: $\mathcal{P}_c^{(0)} \leftarrow \text{Mutation}(x')$ for $\frac{T}{CK}$ times, $\forall\, x' \in \mathcal{N}_l^c$, $\forall\, c \in [C]$.

3: for g = 1, 2, . . . , G do

4: for t = 1, 2, . . . , T/C do

5: $P_c^{(g-1)} = \text{Softmax}\left(A\left(f_l; \mathcal{P}_c^{(g-1)}, x\right)/\tau\right)$ 6: $(x_c, y_c) = \text{Selection}\left(P_c^{(g-1)}, \mathcal{P}_c^{(g-1)}\right)$ -continued

Algorithm 2 Clonal Expansion & Optimization

7: $(x_c', y_c) = \text{Selection}\left(P_c^{(g-1)}, \mathcal{P}_c^{(g-1)}\right)$ 8: $x_{os}' = \text{Crossover}(x_c, x_c')$ 9: $x_{os} = \text{Mutation}(x_{os}')$ 10: $\mathcal{P}_c^{(g)} \leftarrow (x_{os}, y_c)$ 11: end for 12: end for 13: Calculate the affinity score $A(f_l; P^{(G)}, x)$, $\forall c \in [C]$ given $\mathcal{P}^{(G)} = \mathcal{P}_1^{(G)} \cup \ldots \cup \mathcal{P}_C^{(G)}$.

14: end For

15: Select the top 5% as plasma data $S_p^l$ and the top 25% as memory data $S_m^l$ based on the affinity scores, $\forall\, l \in \mathcal{L}$ 16: end For 17: Output: $S_p = \left\{S_p^1, S_p^2, \ldots, S_p^{|\mathcal{L}|}\right\}$ and $S_m = \left\{S_m^1, S_m^2, \ldots, S_m^{|\mathcal{L}|}\right\}$ The goal is to promote diversity and explore the best solutions in a broader searching space.

The selection operation aims to decide which candidates in the generation will be chosen to generate the offspring. In one example, the probability for each candidate is calculated through a softmax function as follows.

$$P(x_i) = \frac{\text{Softmax}\left(A(f_l; x_i x)/\tau\right)\exp\left(A(f_l; x_i, x)/\tau\right)}{= \sum_{xj\in S}\exp\left(A(f_l; x_j, x)/\tau\right)} \quad (5)$$

where S is the set containing data points and $x_i \in S$. $\tau > 0$ is the sampling temperature that controls the distance after softmax operation. Given the probability P of a candidates set S, the selection operation is to randomly pick one example pair $(x_i, y_i)$ from S according to its probability.

$$(x_i, y_i) = \text{Selections}(S, P) \quad (6)$$

In the example embodiment, two parents are selected for each offspring, and the second parent is selected from the same class of the first parent. The parents selection process appears in line 5-line 7 in Algorithm 2.

Next, the crossover operator combines different candidates (parents) for generating new examples (offspring). Given two parents $x_p$ and $x_p^l$, the new offspring is generated by selecting each entry (e.g., pixel) from either $$x_p \text{ or } x_p^l$$

via calculating the corresponding probability. Mathematically, $$x_{os}^l = \text{Crossover}\left(x_p, x_p^l\right) = \begin{cases} x_p^{(i)} \text{ with prob} \dfrac{A(f_l; x_p, x)}{A(f_l; x_p, x) + A(f_l; x_p^l, x)} \\ x_p^{l(i)} \text{ with prob} \dfrac{A(f_l; x_p^l, x)}{A(f_l; x_p, x) + A(f_l; x_p^l, x)} \end{cases} \forall\, i \in [d] \quad (7)$$

where i represents the i-th entry of the example and d is the dimension of the example. The cross-over operator appears in line 8 in Algorithm 2.

This operation mutates each entry with probability p by adding uniformly distributed noises in the range $[-\delta_{max}, -\delta_{min}] \cup [\delta_{min}, \delta_{max}]$. The resulting perturbation vector is subsequently clipped to satisfy the domain constraints.

$$x_{OS} = \text{Mutation}\left(x_{OS}^l\right) = \text{Clip}_{[0,1]}\left(x_{OS}^l + 1_{[Bernoulli(p)]}u([-\delta_{max}, -\delta_{min}] \cup [\delta_{min}, \delta_{max}])\right) \quad (8)$$

where $1_{[Bernoulli(p)]}$ takes value 1 with probability ρ and value 0 with probability 1−ρ. $u([-\delta_{max},-\delta_{min}]\cup[\delta_{min},\delta_{max}])$ is the vector that each entry is i.i.d. chosen from the uniform distribution $U([-\delta_{max},-\delta_{min}]\cup[\delta_{min},\delta_{max}])$. $\text{Clip}_{[0,1]}(x)$ is equivalent to max(0,min(x,1)). The mutation operation appears in line 2 and line 9 in Algorithm 2.

Figure 5:
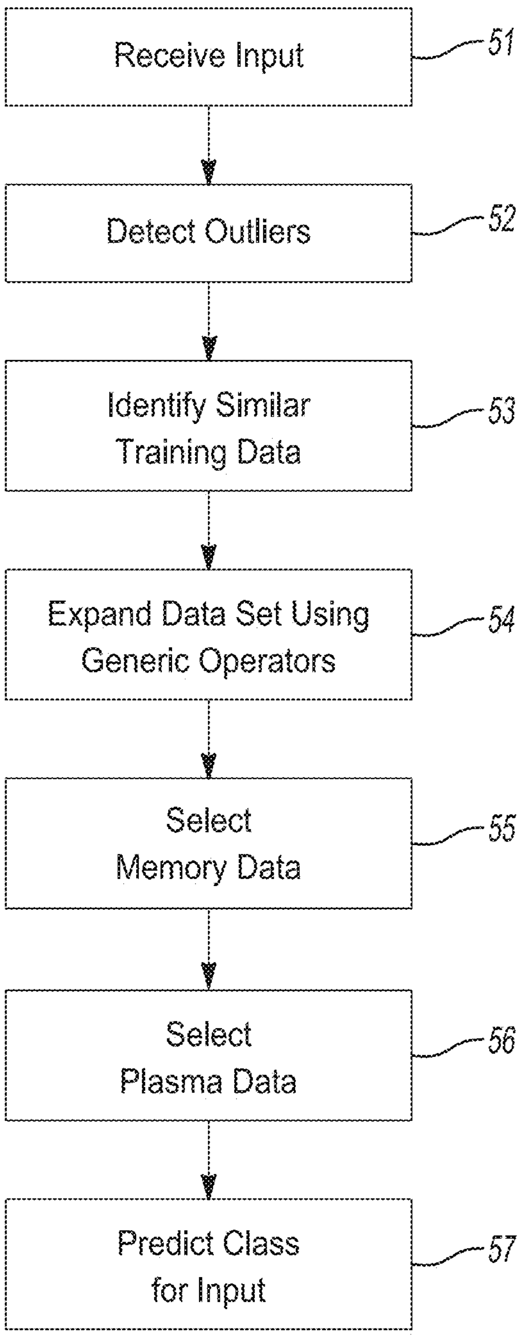
FIG. 5 is a diagram providing an overview of the classification method implemented by the RAILS system.
Figure 6A:
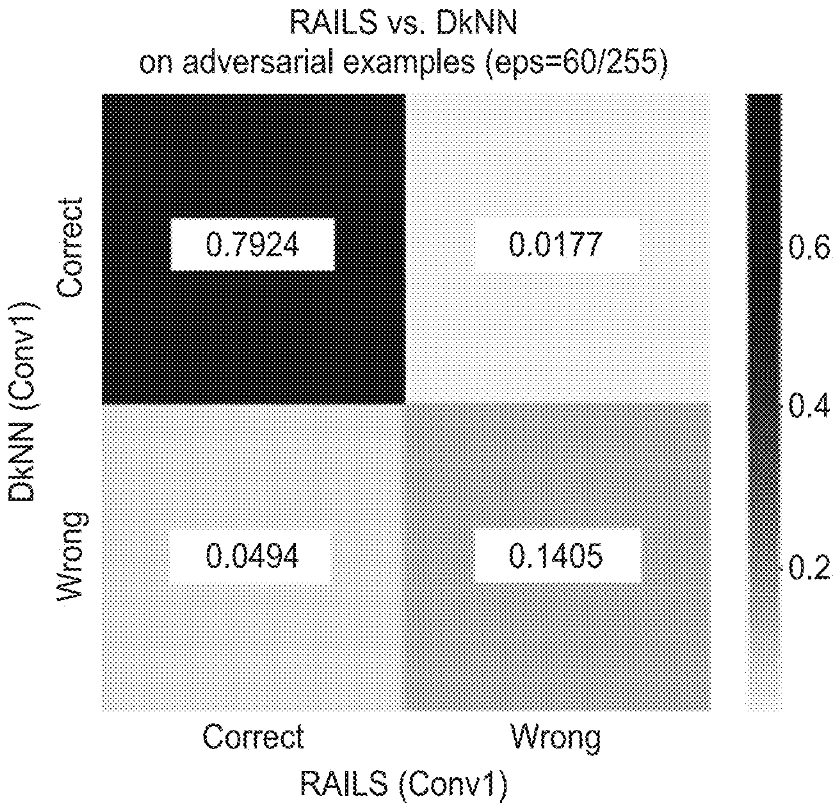
FIGS. 6A and 6B are confusion matrices comparing results for adversarial inputs to the RAILS system and to a k-nearest neighbor method for a first convolutional layer and a second convolutional layer, respectively.
Figure 6B:
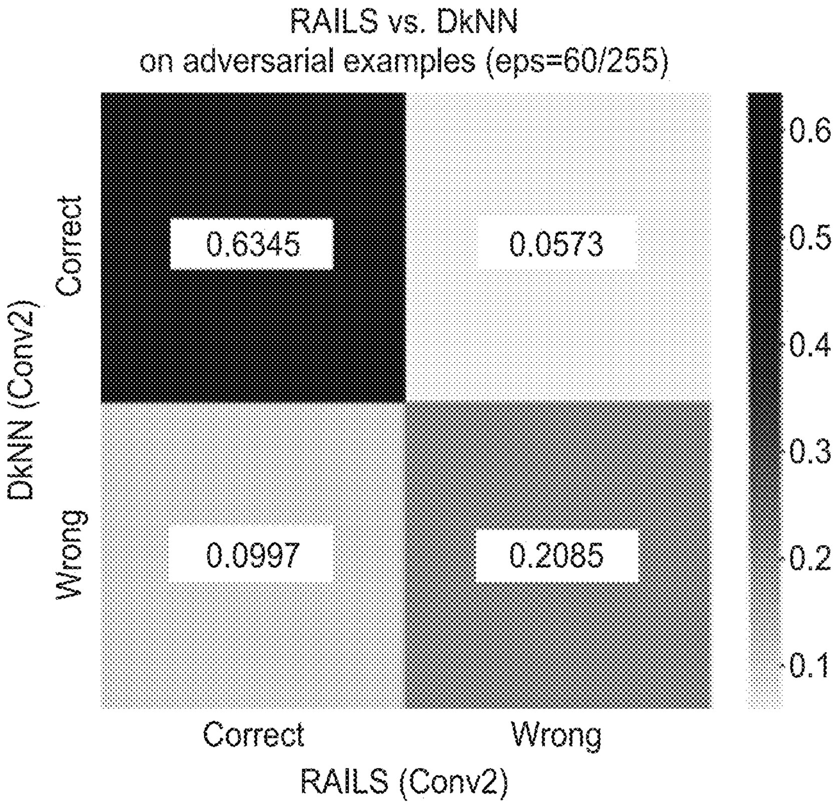
Figure 7A:
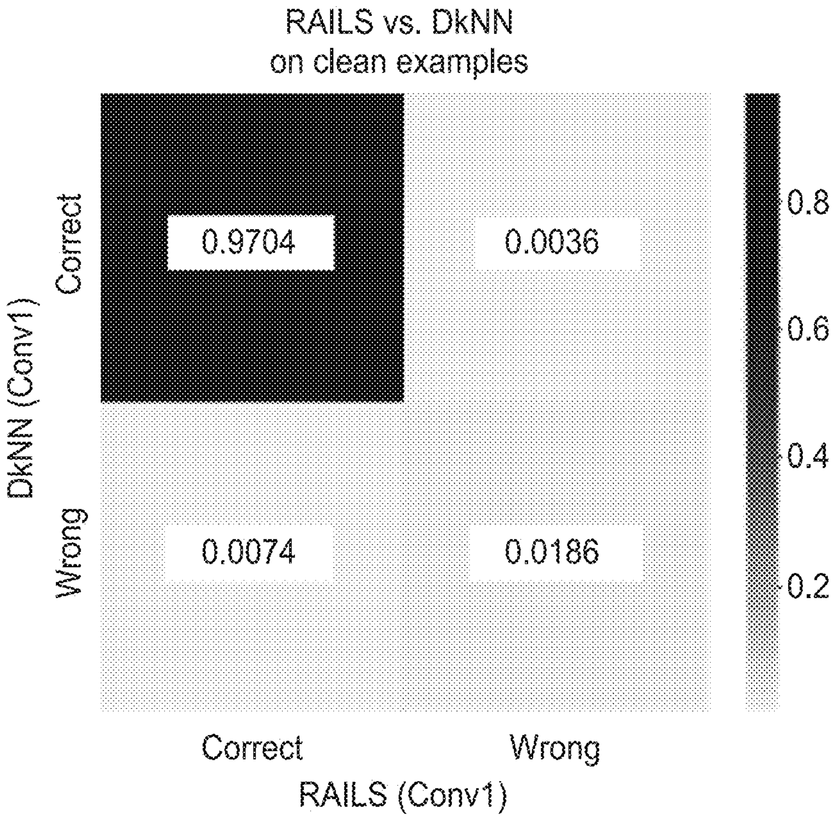
FIGS. 7A and 7B are confusion matrices comparing results for clean inputs to the RAILS system and to a k-nearest neighbor method for a first convolutional layer and a second convolutional layer, respectively.
Figure 7B:
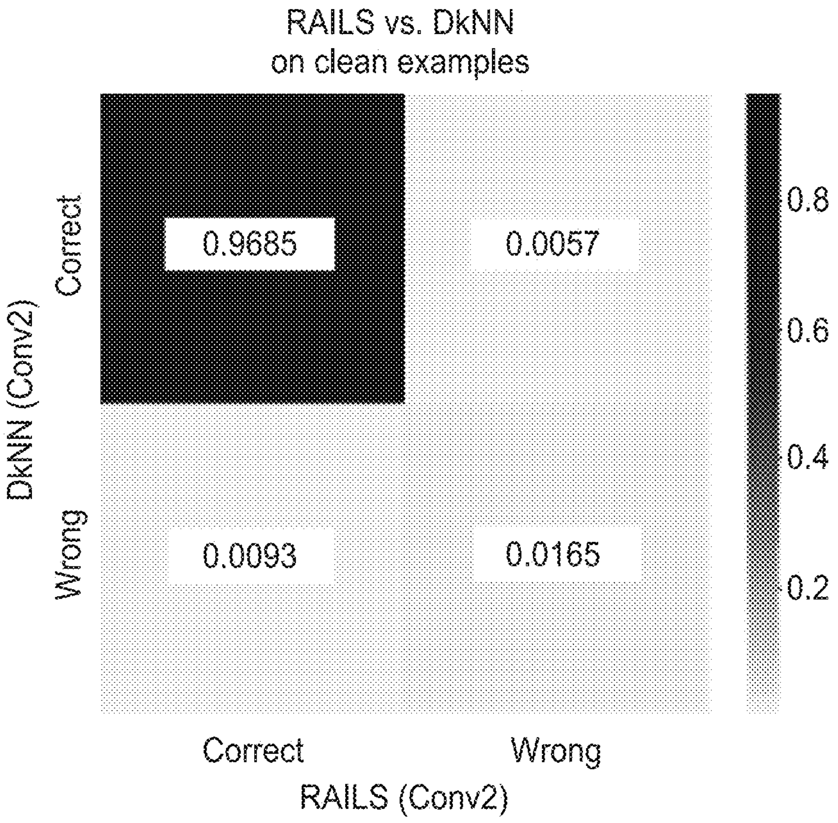

An overview of this classification method is described in relation to FIG. 5. As a starting point, an input to a deep learning system is received as indicated at 51. In one example, the deep learning system is a convolutional neural network with a plurality of hidden layers. The adversarial learning techniques described herein can be applied to other types of deep learning systems as well. It is understood that the deep learning system was trained with a training dataset having data from different classes.

A determination is made at 52 as to whether the input is an outlier. When the input is identified as an outlier, the process continues with the adversarial learning steps as indicated at 53. When the input is identified as a valid input, the input can be classified by the deep learning system without the adversarial learning steps. In some embodiments, detection of outliers can be skipped.

Next, training data similar to the input is identified at step 53. For each class in the training dataset, a set of data points is identified in the training dataset, where the data points in the set of data points are similar to the input. In one example, the set of data points is identified in one or at least one hidden layer of the neural network. In other examples, sets of data points are identified in more than one hidden layer or in each hidden layer of the neural network.

The set (or sets) of identified data points are then expanded using genetic operators. That is, for each set of identified data points, additional data points are generated at 54 from data points in the set of data points using genetic operators. Genetic operators may include but are not limited to selection, mutation and crossover as described above. The identified data points and the additional data points collectively form a pool of data points. For each of the data points in the pool of data points, a similarity score is also calculated in relation to the input.

Memory data is selected at 55 and plasma data is selected at 56. That is, a first subset of data points is selected and a second subset of data points is selected, where the data points in the first subset have an average similarity score higher than the average similarity score of the data points in the second subset of data points, and the data points in the second subset of data points has an average similarity score higher than the average similarity score for all of the data points. In one example, data points in the first subset of data points have a similarity score in top x percent of data points (e.g., top 5%) while the data points in the second subset of data points have a similarity score in top y percent of data points (e.g., top 20%). In another example, data points in the first subset of data points have a similarity score in top x percent of data points (e.g., top 5%) while the data points in the second subset of data points have a similarity score outside the top x percent but within the top y percent of data points (i.e., between 5% and 20%). In any case, the first subset of data points serves as the plasma data and the second subset of data points serves as memory data.

Finally, a prediction of the class label for the input is made at 57 using the plasma data. More specifically, the prediction of a class label for the input is determined by consensus of the data points in the subset of data points with the highest similarity scores. The memory data may be appended to the training data and used to classify subsequent inputs.

For the sake of simplicity, experiments are conducted in the perspective of image classification. The RAILS system 20 is compared to standard Convolutional Neural Network Classification (CNN) and Deep k-Nearest Neighbors Classification (DkNN) using the MNIST dataset. The MNIST dataset is a 10-class handwritten digit database consisting of 60,000 training examples and 10,000 test examples. The RAILS system is tested using a four-convolutional-layer neural network. The performance will be measured by standard accuracy (SA) evaluated using benign (unperturbed) test examples and robust accuracy (RA) evaluated using the adversarial (perturbed) test examples.

In addition to the clean test examples, 10,000 adversarial examples were generated using a 20-step PGD attack with attack strength E=40=60. By default, number of population T=1000, mutation probability ρ=0:15, mutation range parameters $\delta_{min}$=0:05(12:75=255); δmax=0:15(38:25=255), and maximum generation number G=50. To speed up the algorithm, the running stops when the newly generated examples are all from the same class. The sampling temperature r in each layer is set to 3, 18, 18, 72.

First, results were obtained from a single layer of the CNN model in the RAILS system and compared with the results from DkNN. Table 1 below shows the comparison results in the input layer, the first convolutional layer (Conv1), and the second convolutional layer (Conv2).

TABLE 1

SA/RA Performance of RAILS versus DkNN in single layer

| | | Input | Conv1 | Conv2 |
|---|---|---|---|---|
| SA | RAILS | 97.53% | 97.7% | 97.78% |
| | DkNN | 96.88% | 97.4% | 97.42% |

TABLE 1-continued

SA/RA Performance of RAILS versus DkNN in single layer

| | | Input | Conv1 | Conv2 |
|---|---|---|---|---|
| RA | RAILS | 93.78% | 92.56% | 89.29% |
| (∈ = 40) | DkNN | 91.81% | 90.84% | 88.26% |
| RA | RAILS | 88.83% | 84.18% | 73.42% |
| (∈ = 60) | DkNN | 85.54% | 81.01% | 69.18% |

One can see that for both standard accuracy and robust accuracy, RAILS can improve DkNN in the hidden layers and reach better results in the input layer. The input layer results indicate that RAILS can also outperform the performance of supervised learning methods like kNN. Referring to FIGS. 6A, 6B, 7A and 7B, the confusion matrices show that RAILS has less wrong predictions for those data that DkNN gets wrong. Each value in matrices represents the percentage of intersections of RAILS (correct or wrong) and DkNN (correct or wrong).

Clonal expansion of RAILS system creates new examples in each generation. To better understand the capability of the RAILS system, one can visualize the changing of some key indices during the algorithm running. After the expansion and optimization, the plasma data and memory data can be compared to the nearest neighbors DkNN found.

Figure 8A:
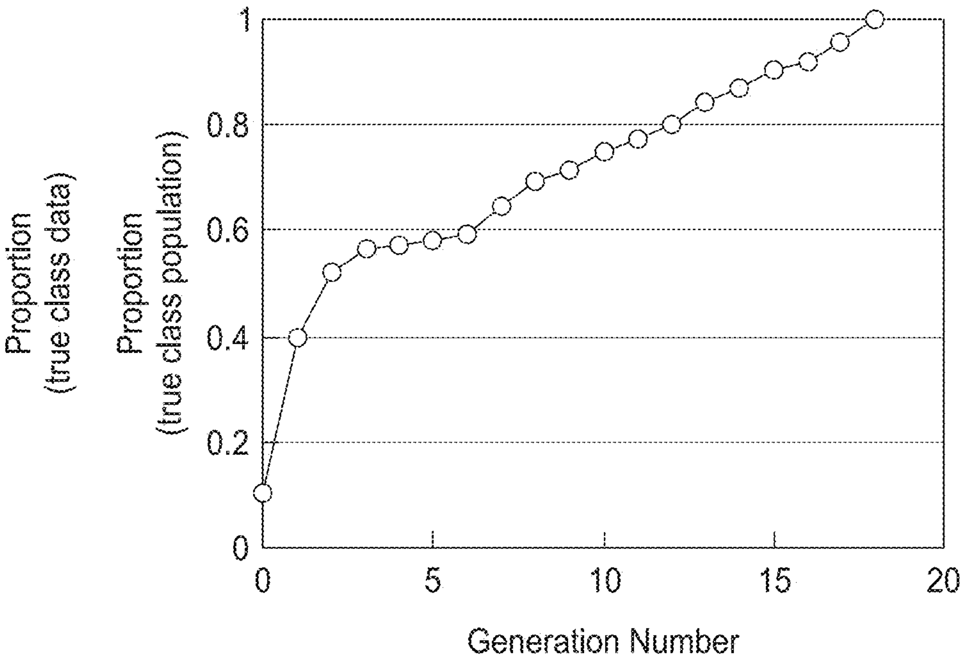
FIGS. 8A and 8B are graphs showing the proportion of the true class population in each generation changes when the generation number increases.
Figure 8B:
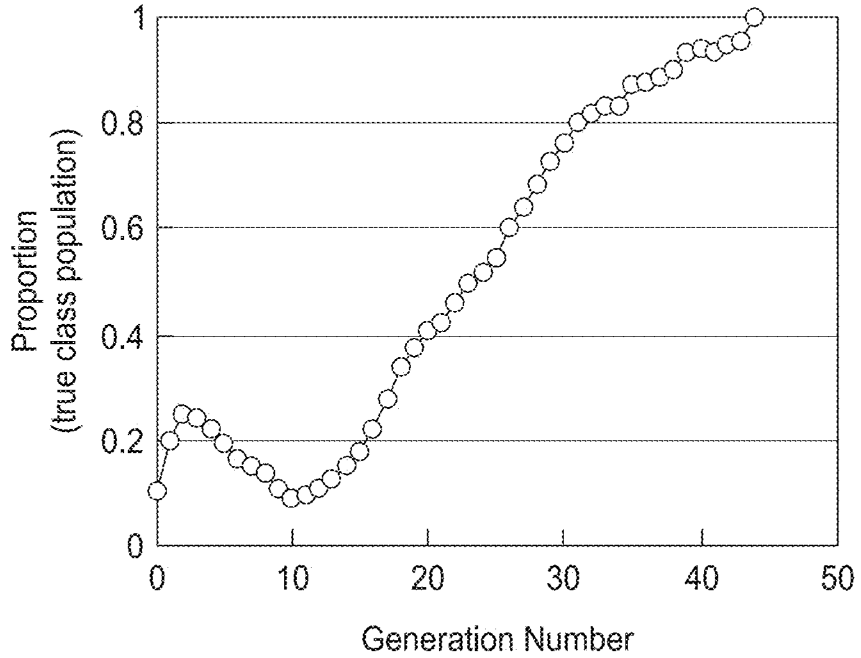
Figure 9A:
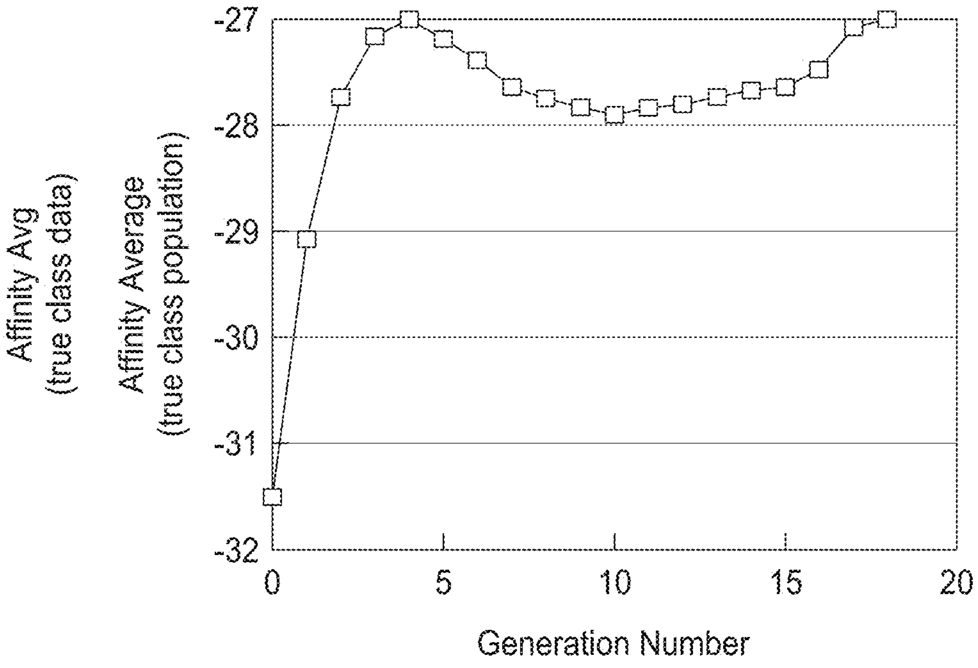
FIGS. 9A and 9B are graphs showing the affinity score of the true class population in each generation change when the generation number increases.
Figure 9B:
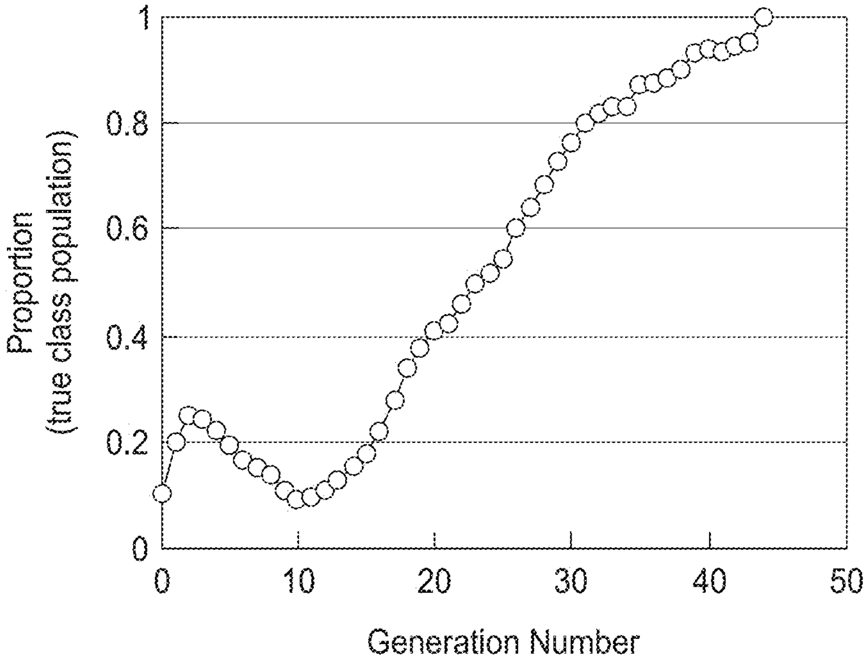

FIGS. 8A and 8B shows how the population of the true class examples in each generation change when the generation number increases; whereas, FIGS. 9A and 9B shows how the population of the true class examples in each generation change when the generation number increases. Two examples are shown. DkNN only makes a correct prediction to the first one and obtains low confidence for all two examples. The data proportion of true class in each generation's population is shown in the first curve row. Data from the true class occupies the majority of population when the generation number increases, which indicates that the RAILS system can obtain correct prediction and the high confidence score, simultaneously. At the same time, clonal expansion over multiple generations produces increased affinity within the true class, as shown in the second curve row. Another observation is that RAILS system requires less generation number when DkNN gets correct, suggests that affinity maturation occurs in fewer generations when test data is easy to classify.

Figure 10:
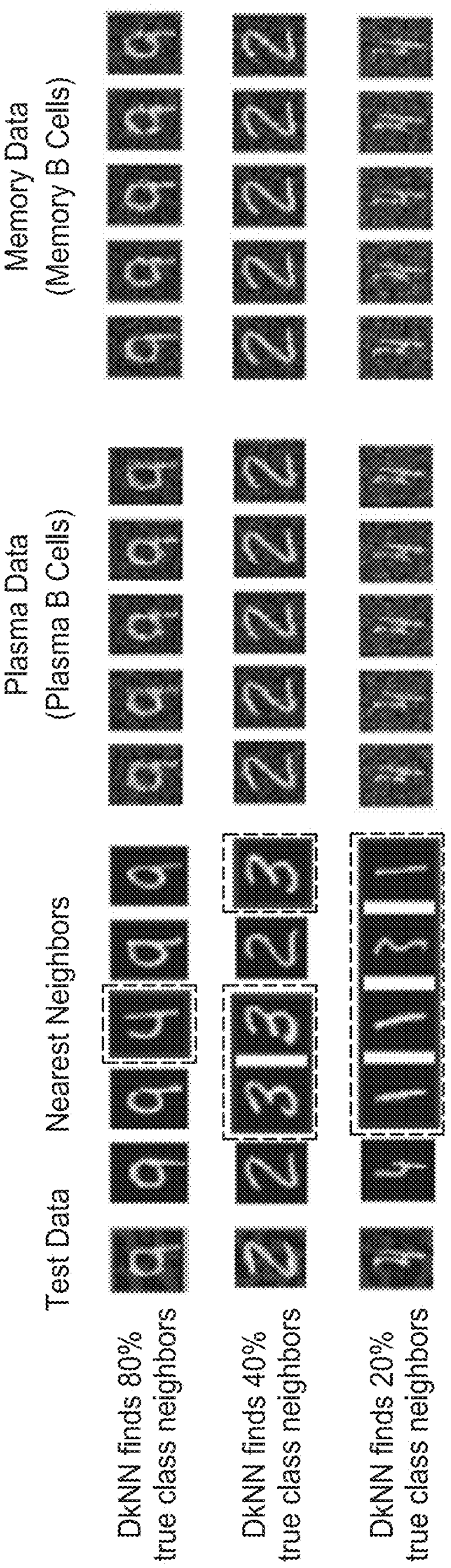
FIG. 10 shows the plasma data and memory data generated by the RAILS system.

FIG. 10 shows the plasma data and memory data generated by the RAILS system. For the first example—digit 9, DkNN gets 9 in four out of five nearest neighbors. For the other two examples—digit 2 and digit 1, the nearest neighbors only contain a small amount of data from the true class. In contrast, the plasma data generated by the RAILS system are all from the true class, which provides correct prediction with confidence value 1. The memory data captures the information of the adversarial variants and is associated with the true label. They can be used to defend future adversarial inputs.

RAILS performance is compare to CNN and DkNN in terms of SA and RA. DkNN use 750 calibration data and 59250 training data. RAILS leverages the static learning to make the predictions. The results are shown in Table 2 below.

TABLE 2

SA/RA Performance of RAILS versus CNN and DkNN (∈ = 60)

| | SA | RA |
|---|---|---|
| RAILS | 97.75% | 76.67% |
| CNN | 99.16% | 1.01% |
| DkNN | 97.99% | 71.05% |

Figure 11A:
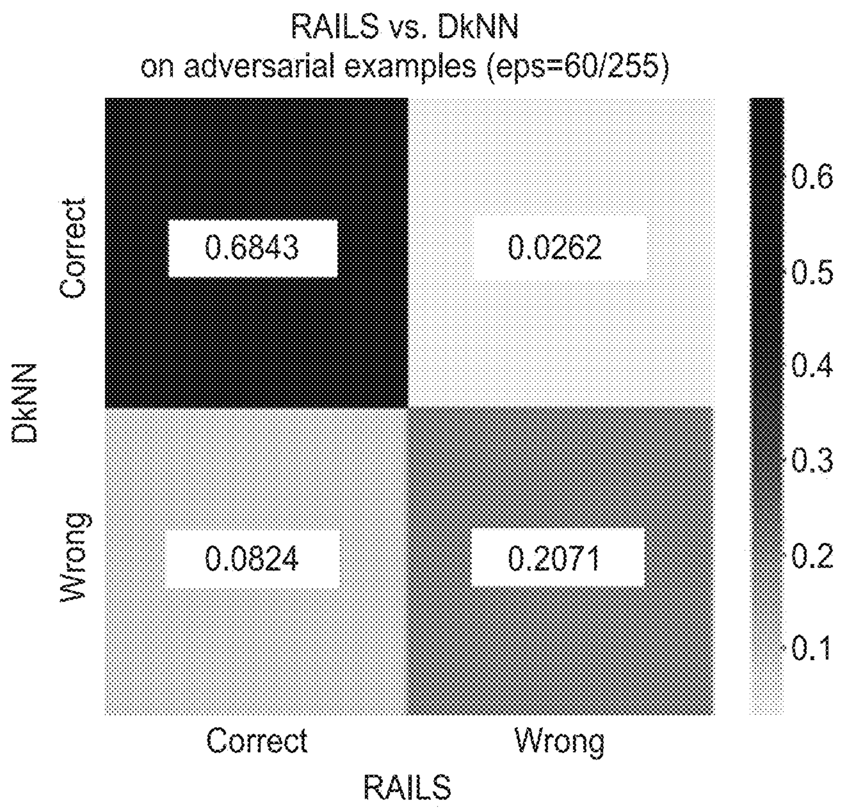
FIGS. 11A and 11B are confusion matrices showing prediction results for adversarial inputs and clean inputs, respectively.
Figure 11B:
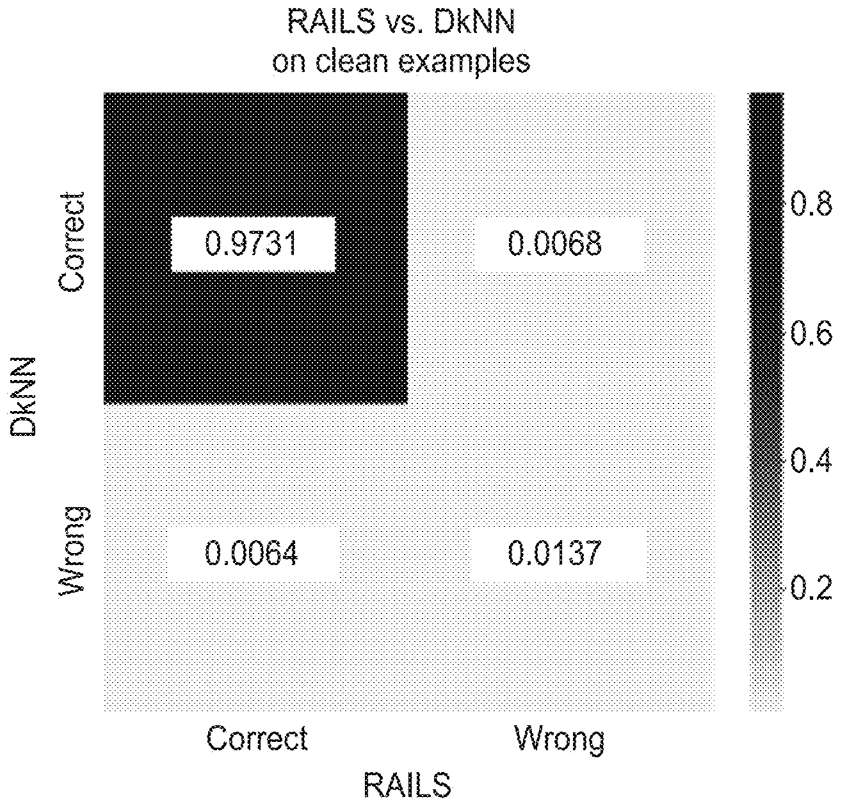

CNN has a poor performance on adversarial examples. One can see that RAILS delivers an additional 5.62% improvement in RA without appreciable loss of SA as compare to applying DkNN alone. The confusion matrices in FIGS. 11A and 11B indicate that the correct predictions of the RAILS system cover a majority of DkNN's correct predictions and overlap with DkNN's wrong predictions.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of classifying an input using a deep learning system, comprising:

receiving, by a computer processor, an input for a deep learning system, where the deep learning system was trained with a training dataset and the training dataset includes data for a plurality of classes;

determining, by the computer processor, whether the input is an outlier;

classifying the input using the deep learning system in response to a determination that the input is not an outlier;

performing adversarial learning in response to a determination that the input is an outlier, where adversarial learning includes the steps of:

for each class in the training dataset, identifying, by the computer processor, a set of data points in the training dataset, where the data points in the set of data points are similar to the input;

for each set of data points, generating, by the computer processor, additional data points from data points in the set of data points using genetic operators, where the identified data points and the additional data points collectively form a pool of data points;

for each of the data points in the pool of data points, calculating, by the computer processor, a similarity score in relation to the input;

selecting, by the computer processor, a subset of data points with the highest similarity scores amongst the data points in the pool of data points; and predicting, by the computer processor, a class label for the input from the plurality of classes, where the prediction of a class label for the input is determined by consensus of the data points in the subset of data points with the highest similarity scores.

2. The method of claim 1 further comprises identifying a set of data points in the training dataset by computing a distance measure between the input and each data point in the training dataset.

3. The method of claim 1 further comprises identifying a set of data points in the training dataset using a k-nearest neighbor method.

4. The method of claim 1 wherein the deep learning system is a neural network with a plurality of hidden layers and further comprises, for one or more of the hidden layers, identifying the set of data points in the training dataset that are similar to the input for each class in the training data set.

5. The method of claim 1 wherein the genetic operators are selected from a group consisting of selection, mutation, and crossover.

6. The method of claim 1 wherein selecting a subset of data points further comprises selecting a first subset of data points and selecting a second subset of data points, where the data points in the first subset of data points have an average similarity score higher than the average similarity score of the data points in the second subset of data points, and the data points in the second subset of data points has an average similarity score higher than the average similarity score for all of the data points.

7. The method of claim 6 further comprises classifying the input to a predicted class in the plurality of classes, where the predicted class has the most similar data points to the input in the first subset of data points; and updating the training dataset by appending the data points in the second subset to the training dataset.

8. A computer-implemented method of classifying an input using a deep learning system, comprising:

receiving, by a computer processor, a first input for a deep learning system, where the deep learning system was trained with a training dataset and the training dataset includes data for a plurality of classes;

determining, by the computer processor, whether the first input is an outlier;

classifying the first input using the deep learning system in response to a determination that the first input is not an outlier;

performing adversarial learning in response to a determination that the first input is an outlier, where adversarial learning includes the steps of:

for each class in the training dataset, identifying, by the computer processor, a set of data points in the training dataset, where the data points in the set of data points are similar to the first input;

for each set of identified data points, generating, by the computer processor, additional data points from data points in the set of identified data points using genetic operators, where the identified data points and the additional data points collectively form a pool of data points;

for each of the data points in the pool of data points, calculating, by the computer processor, a similarity score in relation to the first input;

selecting a first subset of data points and selecting a second subset of data points, where the data points in the first subset of data points have an average similarity score higher than the average similarity score of the data points in the second subset of data points, and the data points in the second subset of data points has an average similarity score higher than the average similarity score for all of the data points;

receiving, by the computer processor, a second input for the deep learning system;

determining, by the computer processor, whether the second input is an outlier using the second subset of data points.

9. The method of claim 8 further comprises predicting a class label for the first input from the plurality of classes, where the prediction of a class label for the first input is determined by consensus of the data points in the first pool of data points with the highest similarity scores.

10. The method of claim 8 further comprises identifying a set of data points in the training dataset using a k-nearest neighbor method.

11. The method of claim 8 wherein the deep learning system is a neural network with a plurality of hidden layers and further comprises, for one or more of the hidden layers in the deep learning system, identifying the set of data points in the training dataset that are similar to the first input for each class in the training data set.

12. The method of claim 8 wherein the genetic operators are selected from a group consisting of selection, mutation, and crossover.

* * * * *